United States Patent Office 3,405,091
Patented Oct. 8, 1968

3,405,091
METHYLENE DIPHENYL OXIDE POLYMERS AND METHODS OF PREPARING THEM
Gerhard R. Sprengling, Derry Township, and Daniel R. Sassano, Monroeville, Pa., Orlin D. Trapp, Linthicum Heights, Md., and Leo S. Chang, Florham Park, N.J., assignors to Westinghouse Electric Corporation, East Pittsburgh, Pa., a corporation of Pennsylvania
No Drawing. Filed Mar. 11, 1964, Ser. No. 351,212
5 Claims. (Cl. 260—47)

The present invention relates to the preparation of a class of novel resinous polymeric compounds. More particularly, the invention relates to the preparation of a class of polymeric methylene diphenyl oxide compounds. The resinous polymers have particular utility at high temperatures both as electrical insulation and as binding agents for laminates. The invention relates primarily to the method of preparation of the resinous polymers and to the polymers themselves.

The resinous polymers obtained by the novel process of the invention are characterized by extraordinarily high thermal and oxidative stability, good film forming properties, toughness, and other properties which render them exceptionally suitable for use as wire coatings, molding and laminating resins, films for electrical insulating or mechanical use, varnish components, and the like.

It has been recognized that, of the available cyclic organic compounds, those deriving from benzene ring configuration are the most stable from a thermal standpoint. It has also been recognized that benzene compounds bound together by ether linkages should provide exceptionally stable compositions. It has been found previously that resinous diphenyl ethers in polymeric form may be prepared from commercially available materials and these compositions have been described and claimed in our copending application Ser. No. 193,943, filed May 11, 1962 and now abandoned.

The present invention stems from the discovery that resinous diphenyl ethers in polymeric form may be easily prepared from hitherto undesirable but commercially available materials at desirable costs.

Specifically, the polymeric diphenyl ether compositions of the invention have the general monomeric configuration

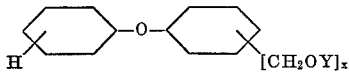

where Y is a lower alkyl substituent having 1 to 4 carbon atoms and $x$ has an average value of from about 0.8 to about 3. Polymers derived from these monomers can have the general formula

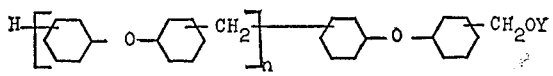

where $n$ is an integer of about 1 to about 9. Reference may be had to French Patent No. 1,321,757 for details of preparing the foregoing monomers.

It will be seen from the foregoing formulae that the connecting methylene linkages between the diphenyl ether moieties derive from the presence, in the monomeric compounds, of one or more alkoxymethyl substituent groups on the diphenyl ethers. The polymeric diphenyl ether compositions defined above have been prepared from monomers containing methoxymethyl groups as set forth in our previously mentioned patent application.

While it would be highly desirable to employ as starting materials monomers containing halomethyl groups, such as chloromethyl, the catalyzed polymerization of chloromethyldiphenyl oxide is both very rapid and exothermic. Moreover, during the polymerization reaction, the by-product consists of hydrochloric acid which is highly corrosive and therefore presents various difficulties in end use. Furthermore, the tendency of chloromethylated diphenyl oxide to form a branched polymer is much higher than that of monomers containing methoxymethyl groups which, in turn, leads to undesirable gel formation early in the polymer conversion. Considered together, these difficulties have resulted in a conversion of chloromethylated diphenyl oxide monomers which is difficult to control or to stop at the desired B-stage. Additionally, varnishes prepared from this composition have tended to have a very limited shelf life.

It is a primary object of the invention to provide a novel method for the preparation of polymeric diphenyl ether compositions wherein halomethylated diphenyl oxide monomers comprise the starting materials.

Another object of the invention resides in the provision of a novel method of preparing polymeric diphenyl ethers which, upon final curing, give off only an alkyl alcohol.

Other objects of the invention will become apparent from the following detailed description thereof.

In a general sense, the invention concerns the initial production of a non-thermosetting novolac resin prepared from the starting material which is the hitherto undesirable chloromethyldiphenyl oxide although other halogen derivatives may also be used. The discovery was made that this polymerization reaction may easily be controlled by incorporating in the reaction mix a proportion of unsubstituted diphenyl oxide. By providing the proper amount of diphenyl oxide, the reaction of the chloromethyldiphenyl oxide monomer becomes easily controllable in manufacture inasmuch as dilution thereof with unsubstituted diphenyl oxide controls the rate of reaction and the desired reaction end point cannot be exceeded.

In practice, the proportions of reactants used to obtain the novolac are within the range of from about 0.5 mol to about 2.0 mols of free diphenyl oxide per 1.0 equivalent of chloromethyl groups substituted on the diphenyl oxide molecules.

The smallest usable proportion of unsubstituted diphenyl oxide may be defined as that amount below which gel formation occurs before completion of the reaction. Inasmuch as chloromethyldiphenyl oxide monomers contain varying amounts of chlorine, the proportions of the reactants are variable since the chloromethyl groups are the only reactive groups present.

The preferred chloromethyldiphenyl oxide monomer is one having an average functionality of about 1. However, the functionality may lie within the range of about 0.8 to about 3. This corresponds to a chlorine content in the monomer of from about 15% to about 32% by weight.

The production of the novolac material of the present invention is carried out in the presence of about 0.008% to about 20% by weight of a catalyst to be hereinafter defined, by heating the mixture at a temperature gradually raised from about 50° C. to 150° C. The heat treatment is carried out over a period of time sufficient to indicate by titration that substantially all of the halogen has been reacted. In those instances where an excess of free diphenyl oxide has been employed, the material may be stripped of residual diphenyl oxide at this point. The resulting novolac will have a functionality value of approximately 0.66.

The definition of the terms used and the nature and proportions of reactants to be used will be better understood by the following explanation of the course of the reactions involved:

(A) Moles of unsubstituted diphenyl oxide are reacted with (B) moles of a chloromethyldiphenyl oxide monomer having ($x$) equivalents of chloromethyl groups, using known catalysts. The reaction is carried on at temperatures rising to 150° C. or higher until all of the chloromethyl groups initially present have reacted and no more HCl is evolved. The final temperature may be further raised and vacuum applied to strip off unreacted diphenyl oxide from the product if any is present. The desired final product of this (step 1) reaction is a resin which is still soluble and fusible. The ratio $x/B$ may be in the range 0.6–3.0; that is, the monomers may contain an average of 0.6 to 3.0 chloromethyl groups per diphenyl oxide moiety. The molar amounts A and B to be used in the reaction to obtain the desired product may be defined in terms of functionality of the final product, which may be derived from the functionality of the reaction mixture and the reaction parameters. "Functionality" is here, and hereinafter, defined as the ratio of equivalents or moles of unreacted or reacted functional groups to moles of diphenyl oxide moieties present. Functional groups are e.g., chloromethyl or methoxymethyl groups. Reacted functional groups are —$CH_2$—, or methylene groups, connecting diphenyl oxide moieties. Functionality of a reaction mixture as above is simply:

$$\frac{x}{A+B} = \text{mixture functionality} = F_{mix}$$

This differs from the functionality of the intended "novolac type" product in that a portion of the diphenyl oxide added in A (or present in B) may remain unreacted. This unreacted diphenyl oxide in amount of $\mu$ moles may be stripped off or carried to the next step. In either case, this amount must be subtracted from the denominator in the above formula to obtain the functionality of the product, thus:

$$\frac{x}{(A+B)-\mu} = \text{novolac product functionality} = F_n$$

The desired product is defined as having $F_n \leqq 0.75$ where $x/B$=approx. 1.0. The quantity A then is to B as 1 to 2 and, by experience, $\mu$ is about 0.33 for $F_n=0.75$. For $F_n<0.75$, relatively larger amounts of A are used. Where a chloromethylated diphenyl oxide monomer with ratio $x/B>1$ is used the maximum functionality $F_n$ of the desired product becomes somewhat less than 0.75 due to the tendency of this monomer to react with itself, as will be apparent to those skilled in the art. Where $\mu$ is zero, it is apparent that $F_{mix}$ will equal $F_n$ and be $\leqq 0.75$.

In a second step, (C) moles of the novolac product above are reacted with (D) moles of a methoxymethyldiphenyl oxide monomer having (y) equivalents of methoxymethyl groups. The basis for calculation of molarity (C) here is the diphenyl oxide moiety plus half the —$CH_2$— groups binding it to other such moieties. The second reaction is generally intended to be carried to a stage in which the two components have co-reacted but at which the product is still soluble in common solvents (e.g., toluene, benzene, et al.). Such product will still contain unreacted methoxymethyl functional groups and will, on further heating, react finally to a thermoset product. The functionality at any stage up to and including the final thermoset product is therefore expressed as above, as the sum of the functional groups (here —$CH_2OCH_3$) and methylene bridges divided by the sum total of bonded or bondable diphenyl oxide moieties present. Any free diphenyl oxide present in the reaction mixture for step 2 must be subtracted as non-bondable. The catalyst may be the same as in step 1 or different.

The ratio $y/D$ and $C/D$ to be used for step 2 may be calculated as follows: The molar amount of any free (unsubstituted) diphenyl oxide (O) present in the methoxy methyl diphenyl oxide monomer is first subtracted from D to calculate the monomer functionality, as $$y/D-O = \text{monomer functionality} = F_{mon}$$

If a final product be desired which is still thermo-plastic when fully reacted then $F_{mon}$ must be equal to or less than the maximum allowable value for $F_n$ in the first step, or approximately 0.75. To obtain a final product which is thermoset (or capable of thermosetting) the value of $F_{mon}$ must be greater than 0.75 and may be 3.0 or greater. The ratio $C/D$ to be used is then calculated according to the degree of cross-linking or functionality desired in the final product ($F_p$). For example, experience has shown that for certain purposes a desirable functionality for the final product may be 1.25. The general equation for $C/D$ is:

$$C/D = \frac{F_{mon}-F_p}{F_p-F_n}$$

To reach a desired value of $F_p=1.25$ using a monomer having an average of 3 methoxy methyl groups per diphenyl oxide moiety and containing no free diphenyl oxide and a novolac from step 1 of $F_n$—0.75, the calculation is:

$$C/D = \frac{3.0-1.25}{1.25-0.75} = 3.50$$

It is to be understood that other combinations may be used to reach essentially the same end product. For example, using instead a monomer containing 2.0 equivalents of methoxymethyl per mole of diphenyl oxide moiety and 10 mole percent of free diphenyl oxide content, the calculation becomes:

$$F_{mon} = \frac{2.0}{1.0-0.1} = 2.22$$

$$C/D = \frac{2.22-1.25}{1.25-0.75} = 1.94$$

It should be understood that products of the same final functionality $F_p$, but reached by different routes as above demonstrated will be approximately equivalent in overall properties but may differ in detailed properties, as will be readily apparent to those skilled in the art.

The catalysts which may be employed for the condensation reaction, both in preparing the novolac and in the reaction thereof with the selected monomer, are of four general types: (1) Friedel-Crafts catalysts such as $AlCl_3$, $ZnCl_2$, $BF_3$, etc.; (2) solids such as silica, diatomaceous earths, bentonites, etc.; (3) some metals in the form of their organic soluble chelates, notably ferric acetyl acetonate; and (4) soluble acids such as p-toluene sulfonic acid. For catalysts in groups (2) and (3), it is generally advantageous that some HCl be present as a co-catalyst or accelerator. The requisite amount of HCl is within the range of about 0.03–0.3% by weight of the reactants. However, HCl per se is not a catalyst for the reaction. Gaseous HCl may be added as an accelerator but the preferred method is to add an amount of chloromethyldiphenyl oxide to generate the desired amount of acid in situ. It is theorized that the effect of the HCl is only to change the group (2) or group (3) catalysts into Lewis acids falling in group (1). Thus, ferric acetyl acetonate may be converted to ferric chloride. Silica may have the HCl adsorbed on its surface and iron or other metal present as an impurity will become available as ferric chloride. There is no doubt that there is some correlation between impurities present on or in the solid catalysts of group (2) and their activity. The catalysts of groups (1) and (4), however, do not require any co-catalyst or accelerator. The catalysts may be employed in amounts of about 0.008% to about 20% of the weight of chloromethyl and diphenyl oxide monomer depending on the particular one employed. The same catalysts may also be employed in similar amounts in the novolac-monomer reaction.

The invention will be further amplified by the following specific examples. In the examples, chloromethyldiphenyl oxide will be referred to as CMDPO and methoxymethyldiphenyl oxide as MMDPO.

EXAMPLE I

|  | Grams | Mol |
|---|---|---|
| CMDPO monomer (16.6% Cl) | 437 | 2 |
| Diphenyl oxide | 170 | 1 |
| FeCl₃·6H₂O | 0.055 | |

Heat reactants in reaction vessel to raise temperature from 50° to 100° in 1½ hours, then further to 250° in 8–9 hours. About 75 g. of HCl are removed in this process. The product is a soluble, fusible resin which is chlorine-free and has a melting range of 80–105° C. When put through a stripping column at 200° C. and 8–9 mm. Hg pressure, 30–32 g. of essentially pure diphenyl oxide are removed from 518 g. of the product. A similar result is obtained if 0.07% of ferric acetyl acetonate is substituted as the catalyst.

EXAMPLE II

|  | Grams | Mol |
|---|---|---|
| CMDPO monomer (17% Cl) | 441 | 2 |
| Diphenyl oxide | 180 | 1 |
| SiO₂ powder ("Minusil 5μ") | 31 | |

Heat batch to 200° C. over the course of 8–10 hours. Product yield 562 g. In the stripping column as above, 550 g. of the product lose 31 g. diphenyl oxide.

EXAMPLE III

| | |
|---|---|
| Novolac product from (Ex. 2) (stripped) _____g__ | 100 |
| MMDPO-monomer (32%—OCH₃) _____g__ | 55 |
| Toluene _____ml__ | 100 |

The mixture is bodied about 2 hours at 105° C., losing toluene in the process. The product has a viscosity of about Z2 Demmler at 25° C. and 65–70% solids in toluene.

EXAMPLE IV

| | |
|---|---|
| Novolac product from (Ex. 2) (stripped) _____g__ | 100 |
| MMDPO monomer (32%—OCH₃) _____g__ | 7 |
| Toluene _____ml__ | 100 |

The mixture is bodied 2 hours at 130° C. The resulting varnish is capable of thermosetting at 150–200° C.

EXAMPLE V

| | |
|---|---|
| Novolac product from (Ex. 1) (stripped) (Ferric acetonyl acetate cat.) _____g__ | 100 |
| MMDPO monomer (32%—OCH₃) _____g__ | 52 |
| Toluene _____ml__ | 100 |

The mixture is reacted for about 2 hours at 150° C. to give a product similar to Example III.

EXAMPLE VI

| | |
|---|---|
| Novolac product from (Ex. 1) (stripped) ____g__ | 100 |
| MMDPO monomer (32%—OCH₃) _____g__ | 102 |
| Toluene _____ml__ | 100 |

The mixture is bodied three hours at 150° C. to yield a product similar to Example III. This varnish thermosets more rapidly and to a harder product than the others.

EXAMPLE VII

| | |
|---|---|
| Novolac product from (Ex. 2) (stripped) _____g__ | 100 |
| MMDPO monomer (32%—OCH₃) _____g__ | 55 |
| Toluene _____ml__ | 100 |

When bodied 2–3 hours at 150° C., this mixture gives a product similar to that in Example III.

A varnish made as in Example VI above is coated on dielectric twists made of No. 17 wire with Du Pont ML enamel which is a linear polyimide material. The coatings obtained are smooth and hard after baking for four hours at 200° C. Thermal breakdown time for these varnished twists is greater than 200 hours at 300° C.

EXAMPLE VIII

|  | Wt. grams | Moles |
|---|---|---|
| CMDPO monomer (17% Cl) | 328 | 1.5 |
| Diphenyl oxide | 170 | 1.0 |
| Ferric acetonyl acetate | 0.25 | |

The reaction is carried out as in Example I. The yield of novolac resin after distilling off unreacted diphenyl oxide is 69% of theory. The material has a melting range of 68–70° C. 58.5 g. of unreacted diphenyl oxide are removed. The novolac is further reacted with MMDPO to produce a thermosettable resinous product having outstanding thermal stability.

EXAMPLE IX

|  | Wt. grams | Moles | Equivalents |
|---|---|---|---|
| CMDPO* monomer (32% Cl) | 47.1 | 0.30 | 0.90 |
| Diphenyl oxide | 84.9 | 1.00 | 1.00 |
| Ferric acetonyl acetate | 0.066 | | |

*This CMDPO, containing 32% Cl, corresponds to an average of three —CH₂Cl groups per molecule.

The mixture is heated gradually to 150° C. over a five hour period, refluxing until evolution of HCl ceases. Vacuum is applied and the temperature is raised to 320° C. and unreacted diphenyl oxide is distilled off. 25.4 grams of diphenyl oxide are recovered. The example illustrates the limiting ratio of CMDPO to diphenyl oxide which may be employed. Substitution of 0.35 mol of CMDPO-32 in the above example causes formation of a gelled resin instead of the desired novolac.

As detailed above, it will be apparent that the present invention permits the use of relatively cheap starting materials such as halomethylated diphenyl oxides. Moreover, at the desired degree of novolac production, free diphenyl oxide may be stripped from the product. Where a diphenyl oxide ether, such as methoxy-methyl or other alkyl substituted diphenyl ethers are employed as starting materials, it is impractical to strip off free diphenyl oxide which is inevitably present. Additionally, the products of the present invention are greatly improved in their physical properties due to the complete freedom from residual free diphenyl oxide.

It will be evident, therefore, that the present invention presents to the art a greatly improved method of preparing polymeric diphenyl oxides characterized by outstanding high temperature physical and electrical properties.

We claim as our invention:

1. A process for the production of a soluble and fusible resinous composition which comprises the steps of (1) mixing together (A) an essentially monomeric halomethyldiphenyl oxide wherein the average number of halomethyl groups per diphenyl oxide moiety is from about 0.6 to about 3.0, (B) an amount of diphenyl oxide to provide a product functionality $(F_n) \leqq 0.75$ and (C) a condensation catalyst selected from the group consisting of Friedel-Crafts catalysts, silica, diatomaceous earth, bentonite, organic soluble metallic chelates, and p-toluene sulfonic acid, (2) heating the mixture of (A), (B), and (C) until substantially all of the halogen has reacted and (3) stripping off any residual diphenyl oxide.

2. A process as in claim 1 and wherein the catalyst is silica.

3. A process for the production of a resinous composition having a final product functionality $F_p$ which comprises the steps of (1) mixing together (A) an essentially monomeric halomethyldiphenyl oxide having an average number of halomethyl groups per diphenyl oxide moiety in the range of from about 0.6 to about 3.0, (B) an amount of diphenyl oxide to provide a product functionality $(F_n) \leqq 0.75$, and (C) a condensation catalyst selected from the group consisting of Friedel-Crafts catalysts, silica, diatomaceous earth, bentonite, organic soluble metallic chelates, and p-toluene sulfonic acid, (2) heating the mixture of (A), (B), and (C) until substantially all of the halogen has reacted, (3) mixing together and heating the foregoing product and an essentially monomeric alkoxymethyldiphenyl oxide having a functionality $F_{mon}$ and the general formula

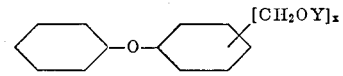

where Y is a lower alkyl substituent having 1–4 carbon atoms and $x$ has an average value of from 0.8 to about 3.0, the foregoing product and said alkoxymethyldiphenyl oxide monomer being present in a molar ratio about equal to the ratio:

$$\frac{F_{m^-n} - F_p}{F_p - F_n}$$

4. A process as in claim 3 wherein the condensation catalyst is silica.

5. A soluble and fusible resinous composition comprising the product obtained by (1) mixing together (A) an essentially monomeric halomethyldiphenyl oxide having an average number of halomethyl groups per diphenyl oxide moiety in the range of from about 0.6 to about 3.0, (B) an amount of diphenyl oxide to provide a product functionality $(F_n) \leqq 0.75$, and (C) a condensation catalyst selected from the group consisting of Friedel-Crafts catalysts, silica, diatomaceous earth, bentonite, organic soluble metallic chelates, and p-toluene sulfonic acid, (2) heating the mixture of (A), (B), and (C) until substantially all of the halogen has reacted and (3) stripping off any residual diphenyl oxide.

References Cited

UNITED STATES PATENTS

| | | | |
|---|---|---|---|
| 2,911,380 | 11/1959 | Doedens | 260—47 |
| 3,082,185 | 3/1963 | Doedens et al. | 260—47 |
| 3,170,959 | 2/1965 | Trapp | 260—47 |
| 3,274,157 | 9/1966 | Doedens | 260—47 |
| 3,316,186 | 4/1967 | Geyer et al. | 260—2.1 |

WILLIAM H. SHORT, *Primary Examiner.*

M. GOLDSTEIN, *Assistant Examiner.*

UNITED STATES PATENT OFFICE
CERTIFICATE OF CORRECTION

Patent No. 3,405,091                                                  October 8, 1968

Gerhard R. Sprengling et al.

It is certified that error appears in the above identified patent and that said Letters Patent are hereby corrected as shown below:

Column 6, lines 57 and 73, and column 8, line 4, "$(F_n) \gtrless 0.75$", each occurrence, should read -- $(F_n) \lessgtr 0.75$ --.

Signed and sealed this 3rd day of March 1970.

(SEAL)
Attest:

Edward M. Fletcher, Jr.                                  WILLIAM E. SCHUYLER, JR.
Attesting Officer                                                Commissioner of Patents